United States Patent

Pokhodnya et al.

[15] 3,688,376
[45] Sept. 5, 1972

[54] DEVICE FOR MANUFACTURING FLUX-CORED WIRE

[72] Inventors: Igor Konstantinovich Pokhodnya, pereulok Mechnikova, 3, kv. 21; Vladimir Fedorovich Alter, ulitsa Lenina, 88, kv. 77; Igor Prokofievich Kaplienko, ulitsa Lenina, 88, kv. 66; Sergei Alexandrovich Suprun, ulitsa Alexeeva, 36, kv. 1; Alexandr Mikhailovich Suptel, Pechersky spusk, 18, kv. 77; Valery Nikolaevich Shlepakov, ulitsa Pushkinskaya, 45, kv. 9, all of Kiev, U.S.S.R.

[73] Assignee: Institut Eleklrosvarki imeni E. O. Patona Akademii Nauk Ukrainskoi SSR, Kiev, U.S.S.R.

[22] Filed: Oct. 30, 1970

[21] Appl. No.: 85,484

[52] U.S. Cl. ............................................29/202.5
[51] Int. Cl. .............................................B23p 19/04
[58] Field of Search ......29/202.5, 200 B, 429, 208 D

[56] References Cited

UNITED STATES PATENTS 3,474,518 10/1969 Strandell.............29/202.5 X
3,543,381 12/1970 Martin.................29/202.5 X

*Primary Examiner*—Thomas H. Eager
*Attorney*—Holman & Stern

[57] ABSTRACT

The invention relates to a machine for manufacturing flux-cored wire which is an enclosed metal casing filled with a powder-like charge, the machine comprising rollers for continuously shaping of the strip into a trough; a feeder in the form of a hopper with a device under it for feeding the charge into the trough; and rollers for shaping the trough into a tube and compacting the charge in it. According to the invention, provision is made for a mechanism for synchronizing the movement of the charge-feeding device with the movement of the strip, the mechanism being built-in between the charge-feeding and the strip-feeding mechanisms.

3 Claims, 3 Drawing Figures

DEVICE FOR MANUFACTURING FLUX-CORED WIRE

The invention relates to the field of manufacturing welding electrode materials and, more specifically, to machines for manufacturing flux-cored wire which comprises an enclosed metal casing filled with a powder-like charge.

Known in the art is a machine for manufacturing this type of wire (See, for example, M.I.Razikov and I.A.Tolstov "Welding Station Foreman's Guide," Machinostroyeniye, Moscow, 1966, p. 63), which comprises non-driving rollers for continuous shaping of a metal strip into a trough, a feeder consisting of a hopper and a feeding device in the form of a conveyor intended to pour the charge into the trough, a batcher in the form of a gate installed in the trough, non-driving rollers for shaping the trough into a tube and compacting the charge in it, and a mechanism for moving the strip.

While it is being drawn through the rollers of this machine, the strip is successively shaped as a trough, then as a tube which is subsequently squeezed for compacting the charge. The charge conveyor in this machine is provided with an individual drive and is deliberately intended for filling the trough with a surplus quantity of the charge. The required quantity of the charge in the trough, i.e., its batching, is obtained after the trough passes under the batching gate which removes the surplus charge from the trough by setting the gate at a certain height above the trough bottom.

Batching of the charge in the trough at the service wire-manufacturing speed in the known machine has a considerable disadvantage. It has been established that such batching fails to ensure continuous filling of the trough with the charge when the speed of its delivery is changed.

This disadvantage limits the wire-manufacturing speed, stops any inverse in labor productivity and does not guarantee the same quality of the wire throughout its length.

An object of the present invention resides in providing a machine for manufacturing flux-cored wire that would substantially increase the speed of wire manufacture.

Another object of the present invention resides in providing a machine for manufacturing flux-cored wire that would make it possible to sharply increase productivity.

Still another object of the invention resides in providing a machine for manufacturing flux-cored wire that would guarantee high quality wire throughout its whole length.

To accomplish these and other objects we hereby disclose a machine for manufacturing flux-cored wire which is an enclosed metal casing filled with a powder-like charge, which machine comprises successively mounted rollers for continuous shaping of the strip into a trough, a feeder consisting of a hopper and a charge-feeding device located under it, which device moves along a closed path and feeds the charge into the trough, rollers for shaping the trough into a tube and compacting the charge in it, and a mechanism for moving the strip. According to the invention, there is a mechanism for synchronizing the movement of the device and the strip; the mechanism being located between the charge-feeding and strip-feeding mechanisms.

In such a design, the feeder supplying the charge into the trough begins to function as a batcher and accurately predetermines the charge placed in the trough at any speed of the latter.

The mechanism for synchronizing the movement of the charge-feeding and strip-feeding mechanisms can be made in the form of a mechanical drive from a shaping roller (which is set into motion due to contact with the moving strip) to the drive of the charge-feeding mechanism.

It is also possible to make the mechanism for synchronizing movement of the charge- and strip-feeding mechanisms in the form of two electric motors working in synchronism and provided with a common armature, one of the motors driving the shaping rollers while the other one drives the charge-feeding mechanism.

The machine for manufacturing flux-cored wire disclosed in accordance with the present invention, as compared with the known machines, has increased the wire-manufacturing speed by three or four times and at the same time, it guarantees that the production has high quality.

Now the invention will be described in detail by way of example with reference to the accompanying drawings, in which.

Figure 1:
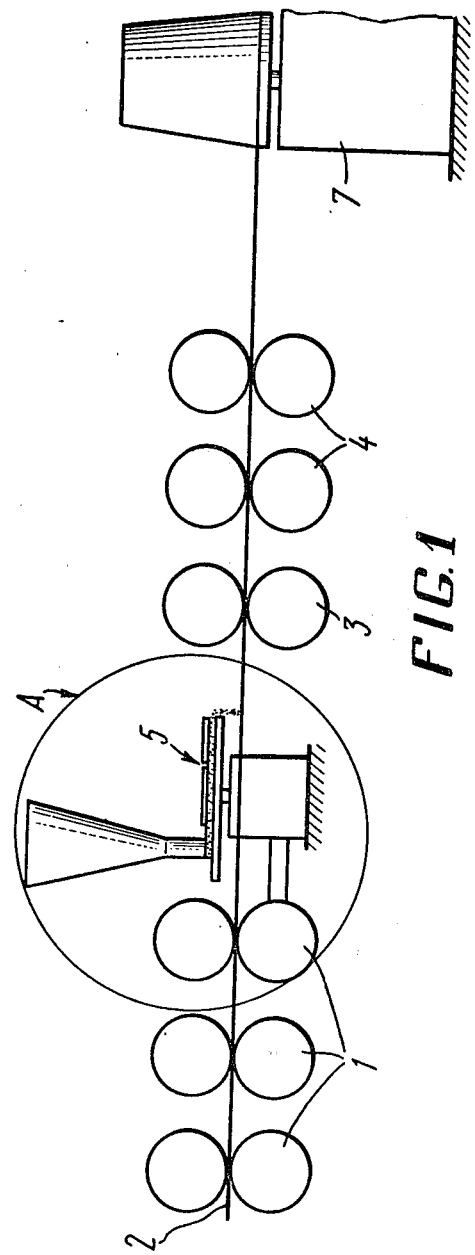
FIG. 1 shows diagrammatically the machine for manufacturing flux-cored wire with non-driving rollers according to the invention.

Shown in FIG. 1 is the device with non-driving rollers 1 for shaping the strip 2 into a trough, non-driving rollers 3 for shaping the trough into a tube, non-driving rollers 4 for compacting the charge in the tube, a feeder 5 for batching the charge and pouring it into the trough 6 (FIG. 2) and a mechanism 7 (FIG. 1) for moving the strip 2.

Figure 2:
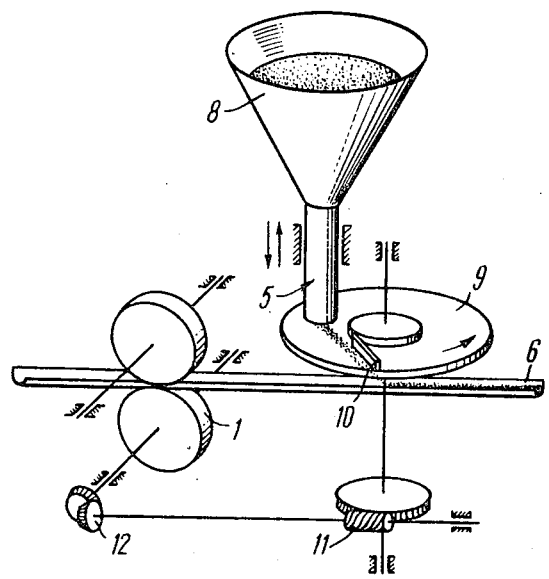
FIG. 2 shows fragment A of FIG. 1.

FIG. 2 shows the feeder 5 which operates the charge hopper 8, a disc 9 delivering the charge into the trough 6, a cutter 10 installed on the disc and intended to direct the batched charge into the trough, and a mechanical drive for driving the disc 9, which drive consisting of a worm gear pair 11 and a bevel gear pair 12.

When the strip 2 is being pulled by the mechanism 7 over the non-driving rollers 1,3 and 4, the rollers are also set in motion due to the contact with the moving strip which, passing through the rollers 1, takes the shape of a trough and is filled with the charge from the hopper 8, after passing through the rollers 3 it takes the shape of a tube with the charge inside, and the tube is then squeezed by the rollers 4.

In the machine shown in FIGS. 1 and 2 the non-driving rollers 1 move the disc 9 in synchronism with the strip 2 by the mechanical drive 11 and 12.

After the hopper 8 has been set at a certain height above the disc 9 (this height being individually selected for each type of wire), the disc 9 will carry only an accurately batched quantity of charge from under the hopper 8 and deliver it into the trough, the speed of trough exerting no influence on the quantity of the charge poured into the trough.

Figure 3:
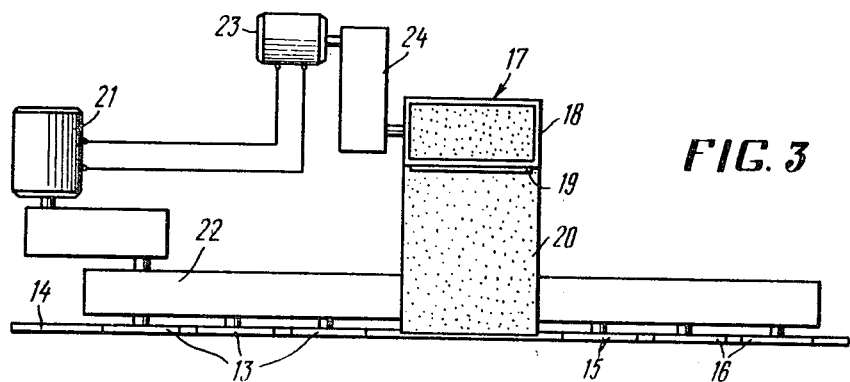
FIG. 3 shows another embodiment of a machine for manufacturing flux-cored wire with driving rollers according to the invention.

FIG. 3 shows a machine comprising driving rollers 13 for shaping the strip 14 into a trough, driving rollers 15 for shaping the trough into a tube, driving rollers 16 for compacting the charge in the tube, a feeder 17 operating the charge hopper 18, a gate valve 19, a device delivering the charge into the trough, which is made in the form of a conveyor 20, a D.C. electric motor 21 of a mechanism 22 for driving the rollers 13, 15 and 16, and a D.C. electric motor 23 of a drive 24 of the conveyor 20. The armatures of the electric motor 21 and 23 are connected in parallel, i.e., these motors have a "common" armature ensuring synchronism of their operation.

When the voltage on the armature terminals of the electric motor 21 changes and, consequently, the armature speed changes too, the voltage and rotation speed of the electric motor 23 will also change in synchronism. This will lead to synchronous changes in the speeds of the strip 14 and conveyor 20.

After the gate valve 19 has been set to a certain height above the surface of the conveyor 20 (this height changing with the type of the wire), conveyor 20 will carry an accurately batched quantity of charge from under the hopper 18 and pour it into the trough, the speed of the trough having no influence on the quantity of the charge poured into it, just as happens in the machine shown in FIGS. 1 and 2.

What we claim is:

1. A machine for manufacturing flux-cored wire which is an enclosed metal casing filled with powder-like charge comprising successively mounted rollers for continuous shaping of the strip into a trough: a hopper with a conveying means located under it, which means moves along a closed path and delivers the charge into said trough; rollers for shaping said trough into a tube and compacting the charge in it; a strip-feeding means; and a mechanism for synchronizing the movement of said conveying means delivering the charge into the trough with the movement of said strip.

2. A machine according to claim 1, wherein said mechanism for synchronizing the movement of said conveying means and strip-feeding means is a mechanical drive transmitting rotary motion from at least one roller of said successively mounted rollers to said conveying means.

3. A machine according to claim 1, wherein said mechanism for synchronizing the movement of said conveying means and strip-feeding means comprises two electric motors operating in synchronism by having their armatures connected in parallel, one of the motors driving said rollers while the other one drives said conveying means.

* * * * *